United States Patent [19]

Höhlein et al.

[11] 4,276,210

[45] Jun. 30, 1981

[54] WATER-DILUTABLE LACQUER BINDERS FOR CHEMICALLY RESISTANT COATINGS

[75] Inventors: Peter Höhlein; Jochen Schoeps, both of Krefeld, Fed. Rep. of Germany

[73] Assignee: Bayer Aktiengesellschaft, Fed. Rep. of Germany

[21] Appl. No.: 95,963

[22] Filed: Nov. 20, 1979

[30] Foreign Application Priority Data

Nov. 24, 1978 [DE] Fed. Rep. of Germany ....... 2850872

[51] Int. Cl.$^3$ .............................................. C08L 33/02
[52] U.S. Cl. ............................ 260/29.4 UA; 525/161; 525/162
[58] Field of Search ............... 260/29.4 UA, 29.6 NR; 525/161, 162

[56] References Cited

U.S. PATENT DOCUMENTS

| | | | |
|---|---|---|---|
| 3,652,478 | 3/1972 | Ishii | 260/29.6 NR |
| 3,743,612 | 7/1973 | Vial | 525/162 |
| 3,798,171 | 3/1974 | Ishii | 260/29.4 UA |
| 3,812,070 | 5/1974 | Kelley | 260/29.4 UA |
| 3,919,154 | 11/1975 | Chang | 525/162 |
| 4,031,052 | 6/1977 | Dhein | 260/29.4 UA |
| 4,065,415 | 12/1977 | Christenson | 260/29.6 NR |
| 4,110,282 | 8/1978 | Pirck | 260/29.6 NR |

*Primary Examiner*—Paul R. Michl

*Attorney, Agent, or Firm*—Connolly and Hutz

[57] ABSTRACT

A water-dilutable lacquer binder comprising a mixture of A. 20 to 94% by weight of a copolymer consisting of copolymerized units of (a) 30 to 65% by weight of an aromatic vinyl or isopropenyl compound having 8 to 14 carbon atoms or of a methacrylic acid alkyl ester having 1 to 4 carbon atoms in the alcohol component, or any mixture thereof; (b) 10 to 30% by weight of at least one acrylic acid alkyl ester having 1 to 8 carbon atoms in the alcohol component; (c) 1 to 20% by weight of maleic acid, fumaric acid, itaconic acid or their semi-esters having 1 to 8 carbon atoms in the alcohol component, (meth)acrylic acid or any mixture of the aforesaid monomers; (d) 5 to 20% by weight of at least one hydroxyalkyl ester of (meth) acrylic acid having 2 to 4 carbon atoms in the alkyl group or glycidyl (meth)acrylate or any mixture of the aforesaid monomers; and (e) 10 to 30% by weight of N-methylol (meth)acrylic acid amide or N-methoxymethyl(meth)acrylic acid amide or any mixture thereof; B. 1 to 40% by weight of a saturated lactam, and C. 5 to 40% by weight of an aminoplast resin; wherein 30 to 100% of the number of carboxyl groups of component A. (c) incorporated in the copolymer have been neutralized by ammonia or monoamines or polyamines.

3 Claims, No Drawings

WATER-DILUTABLE LACQUER BINDERS FOR CHEMICALLY RESISTANT COATINGS

This invention relates to lacquer binders which have a high solids content and contain carboxyl groups, based on a mixture of a self-cross-linkable copolymer containing carboxyl groups, an aminoplast resin and a saturated lactam as reactive diluent, which binders can be diluted with water after neutralisation of the carboxyl groups and are suitable for the manufacture of detergent-resistant stoving lacquers.

By virtue of their particular properties such as resistance to yellowing, weathering resistance and gloss retention, solution polymers of acrylic monomers are used for the formulation of top coat lacquers and one-coat lacquers which must satisfy special requirements on the part of the consumer with respect to these properties.

These binders are at present usually dissolved in organic solvents so that application of the lacquers produced from them causes problems of purification of the contaminated atmosphere.

The well-known water-soluble binders and lacquers based on solution polymers of acrylic monomers used nowadays also still contain relatively large quantities of solvents which contaminate the environment. It is necessary to use these solvents because of the viscosity changes which these binders undergo on dilution with water. If such resin solutions contain too low a proportion of organic auxiliary solvents, it is found that when the neutralized solution is diluted with water, it often passes through a stage in which its viscosity rises again and frequently exceeds the original viscosity of the anhydrous solution (viscosity anomaly). The same phenomenon is also found when poor solubilizing agents are used.

Water-soluble, water-dilutable and water-dispersible lacquer formulations containing binders prepared from carboxyl group-containing acrylate copolymers and aminoplast resins are also known, but they are not completely satisfactory for the special use as detergent-resistant one-coat lacquers. Such a lacquer must satisfy various requirements. It must be suitable for lacquering with stoving and should as far as possible be free from organic solvents which contaminate the environment. The finished lacquer coat must be resistant to saponification and must not yellow. It must also have the usual technical lacquer characteristics such as gloss, hardness, adherence and elasticity.

It was therefore an object of the present invention to prepare lacquer binders with a high solids content which are suitable for the preparation of water-dilutable coating compounds with a high solids content, which in turn give rise to glossy films which after stoving are found to be detergent-resistant and have good technical lacquer characteristics.

The problem was solved by using mixtures of saturated lactams, aminoplast resins and a copolymer of special monomers as binder.

This invention therefore provides water-dilutable lacquer binders obtained from a mixture of A. 20–94% by weight, preferably 45–80% by weight, of a copolymer consisting of copolymerised units of
(a) 30–65% by weight of an aromatic vinyl or isopropenyl compound having 8–14% C-atoms or a methacrylic acid alkyl ester having 1–4 C-atoms in the alcohol component, or mixtures thereof;
(b) 10–30% by weight of at least one acrylic acid alkyl ester having 1–8 C-atoms in the alcohol component;
(c) 1–20% by weight of maleic acid, fumaric acid, itaconic acid or semi-esters thereof having 1–8 C-atoms in the alcohol component, (meth)acrylic acid or mixtures of the said monomers;
(d) 5–20% by weight of at least one hydroxyalkyl ester of (meth)acrylic acid having 2–4 C-atoms in the alkyl group or glycidyl (meth)acrylate or mixtures of the above mentioned monomers; and
(e) 10–30% by weight of N-methylol(meth) acrylic acid amide or N-methoxymethyl (meth)acrylic acid amide, preferably N-methoxymethyl (meth)acrylic acid amide, B. 1–40% by weight, preferably 5–30% by weight, of a saturated lactam, and C. 5–40% by weight, preferably 15–30% by weight, of an aminoplast resin;

wherein 30–100% of the number of carboxyl groups of component A(c) incorporated in the copolymer are neutralized by ammonia or mono- or polyamines.

Below are given the names or formulae of examples of components of Groups A to C:

Group A(a): Styrene, α-methylstyrene, o- and p-chlorostyrene, o-, m- and p-methylstyrene, p-tert.-butylstyrene, and optionally mixtures thereof; styrene is preferred.

Group A(b): Ethyl acrylate, methyl acrylate, n- and isopropyl acrylate, n-butyl acrylate, 2-ethylhexyl acrylate, isooctyl acrylate, tert.-butyl acrylate and mixtures thereof; acrylic acid alkyl esters having 1–4 carbon atoms in the alcohol component are preferred.

Group A(c): Methyl-, ethyl-, n- and iso-propyl-, butyl-, tert.-butyl-, 2-ethylhexyl- and cyclohexyl-semiesters of maleic acid, fumaric acid or itaconic acid, preferably of maleic acid; acrylic acid, methacrylic acid and mixtures of the above mentioned acid monomers. Acrylic acid, methacrylic acid and/or maleic acid semi-esters having 4–8 C-atoms in the alcohol component are preferred.

Group A(d): 2-Hydroxyethyl (meth)acrylate, 2-hydroxy-propyl (meth)acrylate, 4-hydroxybutyl (meth)acrylate, trimethylolpropane mono (meth)acrylate, pentaerythritol mono(meth) acrylate, glycidyl (meth)acrylate and mixtures thereof; 2-hydroxypropyl (meth)acrylate is preferred.

Group A(e): N-methylolacrylic acid amide, N-methylolmethacrylic acid amide, N-methoxymethyl (meth)acrylamide; preferably N-methoxymethylacrylamide.

Group B: Lactams corresponding to the following formula

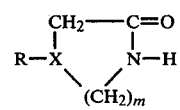

wherein
X denotes a CH-group, in which case
R denotes hydrogen and
m represents 0 or an integer from 1 to 9, or
X denotes a nitrogen atom, in which case
R denotes a saturated aliphatic group, preferably methyl, an araliphatic group having 7–12 carbon atoms or an unsubstituted pyridine group or a pyridine group substituted by lower alkyl groups (C$_1$–C$_4$), and m represents the number 3.

The following lactams are preferred: 1-N-methylhexhydro-1,4-diazepinone-3,ω-dodecyllactam; γ-butyrolactam; δ-valerolactam; particularly ε-caprolactam.

The term "lactams" as used in the present application includes the addition products of the above mentioned lactams with monohydric aliphatic, saturated C$_1$–C$_{10}$ alcohols or with C$_2$–C$_8$ glycols or with polyglycols having 3 or 4 OH groups, such as glycerol, trimethylolpropane, pentaerythritol, etc. The addition products, generally, contain from 0.2 to 5 mol of the above mentioned monohydric or polyhydric compounds to 1 mol of lactam. Such addition products are described in U.S. Pat. No. 3,968,104. The binders preferably contain the free lactams.

Group C: Aldehyde condensation products of melamine urea and benzoguanamine are examples of suitable aminoplast resins. The aldehyde used is generally formaldehyde although suitable products can also be obtained with other aldehydes, such as acetaldehyde, crotonaldehyde, acrolein, benzaldehyde and furfuryl aldehyde. The methylol groups of the aminoplast resins may be etherified with saturated aliphatic monohydric alcohols having 1–4 C-atoms. Melamine resins and urea resins are preferred. Particularly preferred are melamine-formaldehyde condensation products, either non-etherified or etherified with saturated monohydric alcohols having 1–4 C-atoms (see French Pat. No. 943,411 or D. H. Solomon, The Chemistry of Organic Filmformers, 235–240, John Wiley & Sons, Inc., New York, 1967).

The copolymer resin (component A) may be prepared by the usual methods of copolymerisation of components (a)–(e) and is preferably prepared by radical polymerisation, either in the melt or in solution. Polymerisation may be carried out at temperatures of from 70° to 160° C., preferably from 100° to 150° C.

The monomers (a)–(e) are incorporated in the copolymer resin substantially in the proportions in which they are used for polymerisation, and the units incorporated by polymerisation are distributed substantially at random.

Preferred initiators for carrying out the radical polymerisation include, for example, symmetrical aliphatic azo compounds such as azo-bis-isobutyric acid nitrile, azo-bis-2-methyl-valeronitrile, 1,1'-azo-bis-1-cyclohexanenitrile and 2,2'-azo-bis-isobutyric acid alkyl esters; symmetrical diacyl peroxides such as, for example, acetyl, propionyl or butyryl peroxide, benzoyl peroxides substituted with bromo-, nitro-, methyl or methoxy groups, and lauroyl peroxide; symmetrical peroxydicarbonates such as, for example, diethyl, diisopropyl, dicylohexyl and dibenzyl peroxydicarbonate; tert.-butyl peroctoate, tert.-butylphenyl peracetate and peroxycarbonates such as tert.-butyl-N-(phenyl-peroxy)-carbamate or tert.-butyl-N-(2,3-dichloro- or -4-chlorophenylperoxy) carbamate. The following peroxides are also preferred: tert.-butyl hydroperoxide, di-tert.-butyl peroxide, cumene hydroperoxide, dicumene peroxide and tert.-butyl perpivalate.

The initiators may be used in quantitities of from 0.2 to 8.0% by weight, based on the total quantity of monomers. The usual regulators may also be used for polymerisation, in quantities of from 0.1 to 5% by weight, based on the monomers.

When polymerization is carried out in solution, inert solvents such as, for example, ethanol, propanol, isopropanol, n- and isobutanol, methyl ethyl ketone, toluene, xylene, butyl acetate and butyl glycol may be used.

It is particularly suitable to carry out the copolymerisation of monomers (a)–(e) in the presence of component B, i.e. the lactams. The binders according to the invention are then obtained after partial or complete neutralization of the incorporated carboxyl groups and mixing the aminoplast resins. When these binders are used for the preparation of water-dilutable lacquers, no problems of compatibility, viscosity anomalies or crystallisation phenomena are observed. If desired, the solvents mentioned above may be used in addition to the lactam in quantities of from 10 to 90% by weight, preferably from 10 to 70% by weight, based on the lactam.

Since the lactams are saturated, they do not undergo a copolymerisation reaction with the monomers but react with a cross-linking agent through their reactive NH group. The lactams used are mainly non-volatile and are therefore left in the film on hardening.

The copolymers may be freed from volatile constituents at temperatures of from 140° to 200° C. after their preparation. This may be carried out, for example, in evaporator coils under normal pressure by injecting an inert gas such as nitrogen or steam in quantities of from 0.1 to 1 m$^3$ to 1 kg of molten resin or it may be carried out under vacuum in evaporation apparatus such as falling film evaporators, thin layer evaporators, evaporator screws, pressure release evaporators or spray evaporators. The conditions are chosen so that the lactam remains in the binder.

The average molecular weights and the molecular non-uniformities of the copolymer resins were determined by gel permeation chromatography (GPC) on styragels with tetrahydrofuran as eluting agent. After setting up a universal calibration curve (according to Z. Grubisic, P. Rempp and H. Benoit, J. Polymer Sci. Part B, Polymer Letters 5 (1967) 753), the average molecular weight values $\overline{M}_w$ and $\overline{M}_n$ were determined from the distribution of the chromatograms. The polymers have average molecular weights of $\overline{M}_n = 2000$–50,000, preferably $\overline{M}_n = 2000$–15,000, and molecular non-uniformities U ($U = \overline{M}_w/\overline{M}_n - 1$ ($\overline{M}_w$ = weight average, $\overline{M}_n$ = number average molecular weight) of 0.5–200.

When the copolymers have been prepared, they are mixed with lactams in the proportions defined. If polymerisation has been carried out in a lactam, which is the preferred method, the subsequent addition of lactam can be omitted or lactam may be added to bring the quantity within the limits defined.

If the copolymer contains chemically fixed glycidyl groups, it may be modified by reaction with fatty acids; air-drying binders may then be obtained if unsaturated fatty acids are used.

After preparation of the copolymer, the carboxyl groups in the copolymer are partly or completely neutralised. This neutralisation may be carried out in the presence or absence of the lactam and possibly other conventional solvents and in the presence of absence of the aminoplast resin. The degree of neturalization is in the range of from 30 to 100%, i.e. of 1 Gram equivalent of carboxyl groups present, 0.3 to 1 Gram equivalents thereof are neutralised. This results in a pH of the aqueous coating composition in the range of from 5 to 10, preferably in the range of from 7 to 9.

The neutralizing agents used are ammonia or monoamines or polyamines. The following are specific examples: ammonia, ethylamine, diethylamine, triethylamine, trimethylamine, mono-, di- and triethanolamine, and dimethylethanolamine.

The binders according to the invention obtained from the copolymer having partially or completely neutralised carboxyl groups, lactam and aminoplast can be diluted with water. This dilution may be carried out in the presence of organic solvents.

Examples of suitable organic solvents include alcohols having 1 to 4 C-atoms, such as methanol, ethanol, n- and ispropanol and butanols; acetic acid esters having 2–4 C-atoms in the alcohol component, such as ethyl and butyl acetate and ethyl glycol acetate; ethylene glycol monoalkyl ethers having 1–4 C-atoms in the alkyl group, such as ethylene glycol monomethyl, monoethyl and monobutyl ethers; aliphatic and alicyclic ketones such as methyl ethyl ketone, methyl isobutyl ketone, cyclohexanone and acetone; and lower ethers such as tetrahydrofuran and mixtures of the above mentioned solvents.

The aqueous stoving lacquers obtained from the binders according to the invention after dilution with water, optionally in the presence of organic solvents, may contain white pigments, in particular titanium dioxide, in quantities of from 10 to 100% by weight, based on the binder. They may also contain inorganic or organic coloured pigments in quantities of up to 5% by weight and fillers also in quantities of up to 5% by weight, up to 10% by weight of levelling agents, up to 10% by weight of waxes to increase the scratch resistance, and up to 1% by weight of the usual hardening catalysts, the percentages being based in each case on the binder.

The coating compounds prepared in this manner may be applied by conventional methods, e.g. reversal roller coating, spraying, brush coating, immersion or any of the other usual methods of application.

The substrates to which the coating compounds are applied may be metals, glass, synthetic materials or ceramic materials, particularly metals.

Hardening is generally carried out at temperatures of from 80° C. to 250° C. under conditions such that the lactam does not evaporate prematurely. It is sometimes advantageous to begin hardening at temperatures below 120° C. and complete it at temperatures above 120° C.

The coatings obtained after hardening of the coating compositions prepared with the binders according to the invention have advantageous characteristics for practical use and good resistance to chemicals and weathering. The aqueous stoving lacquers obtained from the binders according to the invention are particularly suitable for lacquering household appliances which have metal surfaces, such as washing machines, dishwashing machines and refrigerators, because the coatings obtained have exceptionally high resistance to detergents and solvents combined with high gloss and excellent surface hardness.

The parts and percentages given in the Examples are based on weight unless other indicated.

EXAMPLE 1

600 g of ε-caprolactam were introduced into a glass vessel equipped with a reflux condenser, heating and cooling means and a metering device, and heated to 110° C. A mixture of 179.7 g of 2-hydroxypropyl methacrylate, 441 g of n-butyl acrylate, 1113 g of styrene, 64.5 g of acrylic acid and 352.8 g of N-methoxymethylacrylic acid amide containing 12.0 g of mercaptoethanol was added through the metering device at 110° C. in the course of 3 hours. At the same time, a mixture of 66 g of tert.-butyl perocotoate and 171 g of n-butyl glycol was added dropwise within a period of 4 hours. The mixture was then stirred for 3 hours at 110° C., heated to the reflux temperature (150° C.), and maintained at this temperature for one hour. After pressure filtration, a viscous resin having a solids content of about 91% by weight was obtained in virtually quantitative yield.

The solids content was determined both in this Example and in the following Examples by heating 1 g of resin solution applied to metal lids 7.5 cm in diameter to form a layer of about 50 μm in thickness to 80° C. in a circulating air drying cupboard for one hour.

The copolymer consists of copolymerised units of 8.3% of 2-hydroxypropyl methacrylate, 20.4% of n-butyl acrylate, 5.8% of styrene, 3% of acrylic acid and 16.4% of N-methoxymethyl acrylic acid amide. It has an average molecular weight $\overline{M}_n$ of 2558 and a molecular non-uniformity U of 116.

The acid number of the copolymer is 22 mg KOH/g of substance.

73.4 parts of the resin described above (solids content 91% by weight; copolymer+caprolactam+n-butylglycol) are neutralised with 2.04 parts of dimethylethanolamine. 26.35 parts of the neutralized resin are mixed with 4.01 parts of a commercial melamine formaldehyde resin etherified with methanol (Resimene 745 ®, Trade product of Monsanto). To prepare a white lacquer, the binder described above is triturated with 19.24 parts of titanium dioxide (rutile type), 0.47 parts of p-toluenesulphonic acid (10% in isopropanol), 0.21 parts of a commercial levelling agent, 45 parts of butyl glycol and 20.56 parts of water, and adjusted to a spray viscosity of 50 seconds according to DIN 53211 by addition of a butyl glycol/water mixture in the ratio by weight of 1:1. The white lacquer obtained is applied to zinc phosphatised steel sheets by spraying (thickness of dry film about 25–30 μm) and stoved for 10 minutes in a circulating air drying cupboard at 180° C.

The characteristic data (acid number of copolymer, solids content of copolymer solution, viscosity of binder) and experimental results of the hardened film (Gardner gloss, detergent resistance) are shown in the Table.

TEST FOR DETERGENT RESISTANCE

The lacquer metal sheets used as test samples (thickness of films 30 μm, stoved 10 minutes at 180° C.) were kept for 4 hours at 95° C. in a 0.2% aqueous solution of a commercial detergent based on pentasodium tripolyphosphate, sodium metasilicate, sodium carbonate, ethoxylated nonylphenol (10 ethylene oxide units per mol of phenol) and cyanuric acid chloride.

After rinsing with cold water, the sheets are again exposed to 0.3% solution of the above detergent at 95° C. for 4 hours. Detergent resistance is attested when this test cycle (total 480 minutes) has been carried out twice without blistering or loss of gloss of the lacquer films.

COMPARISON EXPERIMENT

Example 1 was repeated but with the modification that 600 g of n-butyl glycol were used instead of 600 g of ε-caprolactam. The solids content of the viscous resin was 71%, and the acid number of the copolymer was 23. The composition of the copolymer corresponds to the copolymer composition of Example 1. $\overline{M}_n=2284$, U=86.

The characteristic data and experimental results are shown in the Table.

When the results are compared, it is found that the solids content of the resin solution prepared by copolymerisation of the monomers in ε-caprolactam is substantially higher and the viscosity of the binder of Example 1 is substantially lower than the corresponding values of the comparison product. It is also found that lacquer films containing the binders according to the invention withstand the detergent test but films formed from the comparison products do not, since after only 420 minutes blisters are formed and the lacquer film loses its shine. Finally, the initial value (before the detergent test) of the gloss according to Gardner is distinctly lower in the comparison product than in the lacquer film of a coating prepared from a binder according to the invention.

EXAMPLE 2

The monomer mixture is composed of 179.7 g of 2-hydroxypropyl methacrylate, 441 g of 2-ethylhexyl acrylate, 1113 g of styrene, 64.5 g of acrylic acid, 352.8 g of N-methoxymethylacrylic acid amide and 12 g of mercaptoethanol. The initiator mixture consisted of 66 g of tert.-butyl peroctoate and 171 g of butyl glycol. 600 g of ε-caprolactam were introduced into the reaction vessel. The copolymer was prepared by a method analogous to that of Example 1, as were also the binder and the white lacquer. The characteristic data and experimental results of the stoved lacquer film are shown in the Table.

EXAMPLE 3

The procedure was the same as in Example 1 except for the following alterations: the monomer mixture consisted of 495 g of 2-hydroxypropyl methacylate, 1232 g of butyl acrylate, 3107 g of styrene, 178 g of acrylic acid, 972 g of N-methoxymethacrylic acid amide and 70 g of mercaptoethanol. The initiator solution consisted of 254 g of tert.-butyl peroctoate and 485 g of butyl glycol. 1697 g of ε-caprolactam and 1510 g of butyl glycol were introduced into the reaction vessel. The copolymer and lacquer binder obtained had the characteristic data shown in the Table and the hardened film gave the experimental results in practical tests as indicated.

EXAMPLE 4

Example 1 was repeated but with the following modifications: the monomer mixture consisted of 495 g of hydroxypropyl methacrylate, 1232 g of butyl acrylate, 3007 g of styrene, 178 g of acrylic acid, 972 g of N-methoxymethyl acrylic acid amide and 70 g of mercaptoethanol. The initiator mixture was composed of 254 g of tert.-butyl peroctoate and 475 g of butyl glycol. 755 g of butyl glycol and 2452 g of ε-caprolactam were introduced into the reaction vessel. The characteristic data of the copolymer and of the binder and the test data obtained from practical tests on the hardened film are summarised in the Table.

TABLE

| | Characteristic data and experimental results | | | | |
|---|---|---|---|---|---|
| Example | 1 | 2 | 3 | 4 | Comparison |
| A. Characteristic data | | | | | |
| Acid number of copolymer | 22 | 22 | 18 | 18 | 23 |
| Solids content (%) | 91 | 91 | 80 | 87 | 71 |
| Viscosity of binder, 50% in butyl glycol, according to DIN 53 211 (sec) | 105 | 127 | 101[1] | 66 | 447 |
| B. Test results | | | | | |
| Gloss according to Gardner 20° angle (ASTM 523) | 78 | 76 | 91 | 92 | 53 |
| Detergent resistance test (min) | 2×480 Passed | 2×480 Passed | 2×480 Passed | 2×480 Passed | 420 Failed |

[1]Viscosity, 60% in butyl glycol according to DIN 53211 (sec)

We claim:

1. A water-dilutable lacquer binder comprising a mixture of
   A. 20–94% by weight of a copolymer consisting of copolymerized units of
      (a) 30–65% by weight of an aromatic vinyl or isopropenyl compound having 8–14 C-atoms or of a methacrylic acid alkyl ester having 1–4 C-atoms in the alcohol component, or any mixture thereof;
      (b) 10–30% by weight of at least one acrylic acid alkyl ester having 1 to 8 C-atoms in the alcohol component;
      (c) 1–20% by weight of maleic acid, fumaric acid, itaconic acid or their semi-esters having 1–8 C-atoms in the alcohol component, (meth)acrylic acid or any mixture of the aforesaid monomers;
      (d) 5–20% by weight of at least one hydroxyalkyl ester of (meth)acrylic acid having 2–4 C-atoms in the alkyl group or glycidyl (meth)acrylate or any mixture of the aforesaid monomers; and
      (e) 10–30% by weight of N-methylol (meth)acrylic acid amide or N-methoxymethyl (meth)acrylic acid amide or any mixture thereof;
   B. 1–40% by weight of a saturated lactam, and
   C. 5–40% by weight of an aminoplast resin;
wherein 30–100% of the number of carboxyl groups of component A.c. incorporated in the copolymer have been neutralised by ammonia or monoamines or polyamines.

2. A lacquer binder, as claimed in claim 1, comprising 45 to 80% by weight of component A, 5 to 30% by weight of component B, and 15 to 30% by weight of component C.

3. An aqueous coating composition comprising a lacquer binder, as claimed in claim 1.

* * * * *